US012775191B2

(12) United States Patent
Chevallier et al.

(10) Patent No.: US 12,775,191 B2
(45) Date of Patent: Oct. 27, 2026

(54) OPTICAL SYSTEM, INSULATING GLAZING COMPRISING SUCH AN OPTICAL SYSTEM, PROCESS FOR MANUFACTURING THIS INSULATING GLAZING AND PROCESS FOR PROTECTING AN OPTICAL SYSTEM

(71) Applicant: SAINT-GOBAIN GLASS FRANCE, Courbevoie (FR)

(72) Inventors: Théo Chevallier, Paris (FR); Nicolas Mercadier, Minneapolis, MN (US)

(73) Assignee: SAINT-GOBAIN GLASS FRANCE, Courbevoie (FR)

(*) Notice: Subject to any disclaimer, the term of this patent is extended or adjusted under 35 U.S.C. 154(b) by 801 days.

(21) Appl. No.: 17/788,122

(22) PCT Filed: Dec. 28, 2020

(86) PCT No.: PCT/FR2020/052635
§ 371 (c)(1),
(2) Date: Jun. 22, 2022

(87) PCT Pub. No.: WO2021/136914
PCT Pub. Date: Jul. 8, 2021

(65) Prior Publication Data
US 2023/0033668 A1 Feb. 2, 2023

(30) Foreign Application Priority Data
Jan. 2, 2020 (FR) ....................................... 2000008

(51) Int. Cl.
*G02F 1/15* (2019.01)
*B29D 11/00* (2006.01)
(Continued)

(52) U.S. Cl.
CPC ............ *G02F 1/15* (2013.01); *B29D 11/0074* (2013.01); *C03B 27/00* (2013.01);
(Continued)

(58) Field of Classification Search
None
See application file for complete search history.

(56) References Cited

U.S. PATENT DOCUMENTS 5,699,192 A 12/1997 Van Dine et al.
6,115,171 A 9/2000 Minami et al.
(Continued)

FOREIGN PATENT DOCUMENTS

CN 1620408 A 5/2005
CN 108227328 A 6/2018
(Continued)

OTHER PUBLICATIONS

International Search Report as issued in International Patent Application No. PCT/FR2020/052635, dated Mar. 12, 2021.
(Continued)

*Primary Examiner* — Stephone B Allen
*Assistant Examiner* — Tamara Y. Washington
(74) *Attorney, Agent, or Firm* — CUSHMAN PARTNERS LLC

(57) ABSTRACT

An system includes an optical element including a glazing-function substrate and an electrochromic stack formed on this substrate, this electrochromic stack including a first transparent conductive layer, a working electrode arranged above the first transparent conductive layer, a counter-electrode arranged above said working electrode, a second transparent conductive layer arranged above the counter-electrode, lithium ions introduced into the electrochromic stack, and optionally a separate layer of an ionic conductor, the latter layer being intermediate between the electrode and the counter-electrode, a protective layer arranged on the electrochromic stack, the protective layer including an inorganic lubricating compound.

19 Claims, 2 Drawing Sheets

(51) Int. Cl.

| | |
|---|---|
| ***C03B 27/00*** | (2006.01) |
| ***C03C 17/36*** | (2006.01) |
| ***G02F 1/1333*** | (2006.01) |
| ***G02F 1/1523*** | (2019.01) |
| ***G02F 1/155*** | (2006.01) |
| *G02F 1/1343* | (2006.01) |
| *G02F 1/153* | (2006.01) |
| *G02F 1/161* | (2006.01) |

(52) U.S. Cl.

CPC ...... *C03C 17/3657* (2013.01); *C03C 17/3671* (2013.01); *C03C 17/3681* (2013.01); *G02F 1/133345* (2013.01); *G02F 1/1525* (2013.01); *G02F 1/155* (2013.01); *C03C 2217/78* (2013.01); *C03C 2218/355* (2013.01); *G02F 1/13439* (2013.01); *G02F 1/1533* (2013.01); *G02F 2001/1536* (2013.01); *G02F 2001/1557* (2013.01); *G02F 1/161* (2013.01)

(56) References Cited

U.S. PATENT DOCUMENTS

| | | | | |
|---|---|---|---|---|
| 2019/0062924 | A1* | 2/2019 | Czettel | C23C 14/0641 |
| 2019/0177219 | A1* | 6/2019 | Karam | C03C 27/10 |

FOREIGN PATENT DOCUMENTS

| | | | |
|---|---|---|---|
| CN | 207875047 | U | 9/2018 |
| CN | 110223604 | A | 9/2019 |
| CN | 111491804 | A | 8/2020 |
| EP | 0 253 713 | A1 | 1/1988 |
| EP | 0 382 623 | A1 | 8/1990 |
| EP | 0 518 754 | A1 | 12/1992 |
| EP | 0 532 408 | A1 | 3/1993 |
| EP | 0 670 346 | A1 | 9/1995 |
| EP | 0 831 360 | A1 | 3/1998 |
| EP | 0 867 752 | A1 | 9/1998 |
| EP | 2 724 194 | B1 | 1/2019 |
| JP | 6609085 | B1 | 11/2019 |
| TW | 201704010 | A | 2/2017 |
| WO | WO 00/57243 | A1 | 9/2000 |
| WO | WO 2012/177790 | A2 | 12/2012 |

OTHER PUBLICATIONS

First Office Action as issued in Chinese Patent Application No. 202080089270.8, dated Jun. 7, 2023.

* cited by examiner

[Fig. 1]
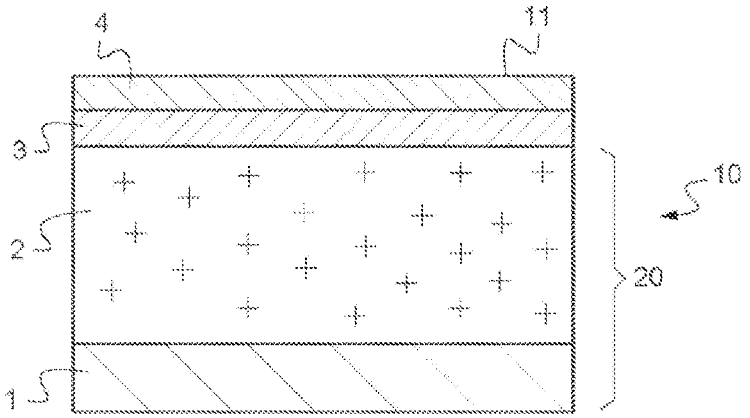
[Fig. 2]
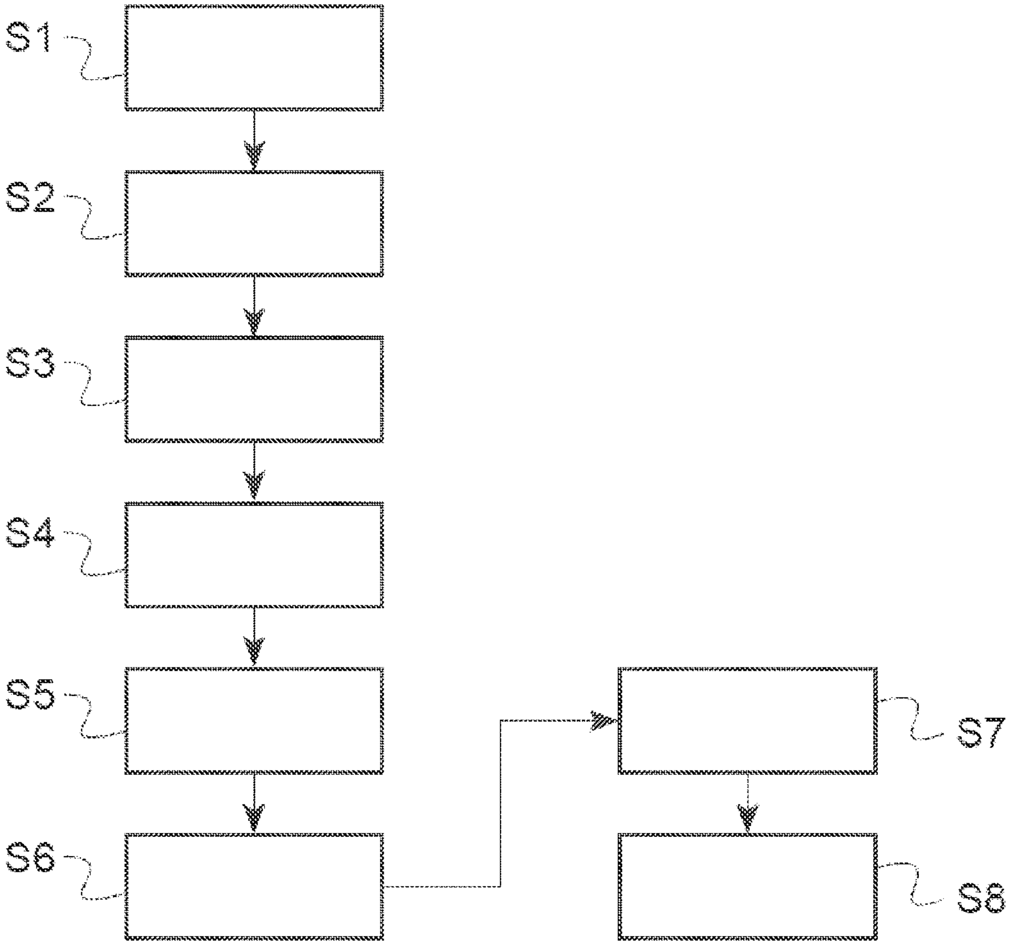

[Fig. 3]
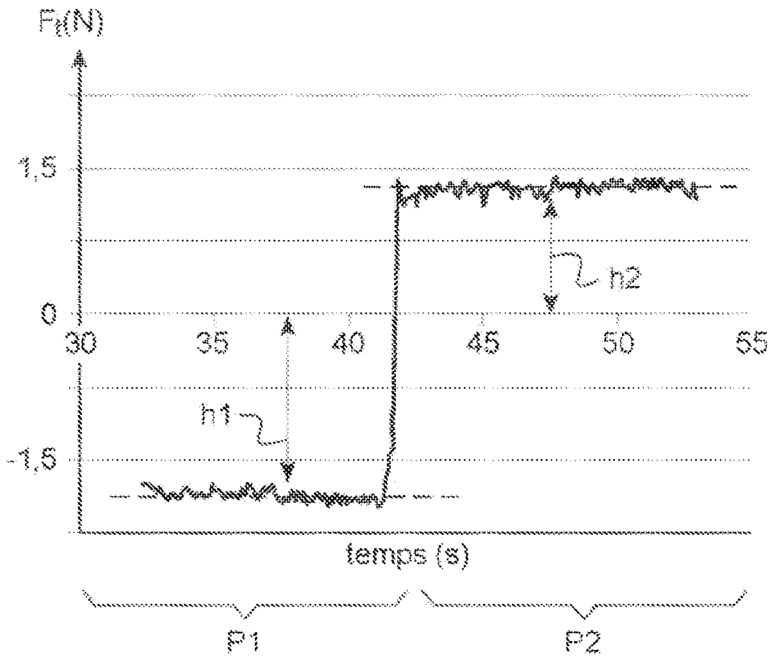

OPTICAL SYSTEM, INSULATING GLAZING COMPRISING SUCH AN OPTICAL SYSTEM, PROCESS FOR MANUFACTURING THIS INSULATING GLAZING AND PROCESS FOR PROTECTING AN OPTICAL SYSTEM

CROSS-REFERENCE TO RELATED APPLICATIONS

This application is the U.S. National Stage of PCT/FR2020/052635, filed Dec. 28, 2020, which in turn claims priority to French patent application number 2000008 filed Jan. 2, 2020. The content of these applications are incorporated herein by reference in their entireties.

The present invention relates to an optical system, to an insulating glazing comprising such an optical system, to a process for manufacturing this insulating glazing and to a process for protecting an associated optical system.

Electrochromic devices are electrochemical devices with electrically controllable optical and/or energy properties. These devices have certain characteristics that may be modified under the effect of a supply of electricity suitable for modifying the state of the electrochromic device between a clear state and a tinted state. Said modifiable characteristics are in particular the following: transmittance, absorbance, reflectance at certain wavelengths of the electromagnetic spectrum, and in particular in the visible and/or in the infrared, or even how much light is scattered. The variation in transmittance generally occurs in the optical (infrared, visible, ultraviolet) domain and/or in other domains of the electromagnetic spectrum, and this is why it is referred to as a device with variable optical and/or energy properties, the optical domain not necessarily being the only domain in question.

Specifically, these devices, when used as glazings, allow, from the thermal/energy point of view, the solar load inside rooms or cabins/compartments to be controlled when they are installed as exterior architectural glazings or windows of means of transport such as automobiles, trains, airplanes, etc., and allow excessive heating thereof in case of high insolation to be avoided.

From the optical point of view, these devices allow the degree of vision to be controlled, this allowing, when they are installed as exterior glazings, glare in case of high insolation to be avoided. They may thus have a particularly advantageous shutter effect, both when used as exterior glazings and when used as interior glazings, for example as part of interior partitions between rooms (offices in a building) or to isolate compartments in trains or airplanes for example.

The process of manufacturing electrochromic devices requires the production of glazing substrates, for example substrates made of glass, that are coated on one side with a stack of a plurality of thin layers of different thicknesses and natures (such a stack is referred to as an “electrochromic stack” in the present patent application). The production of such substrates with a view to the manufacture of electrochromic devices and, subsequently, of an insulating glazing often involves various converting, processing, handling, cleaving or cutting, transporting, washing and/or storing operations. Specifically, it is common and practical to carry out various assembly and/or processing operations on a site other than that on which the substrates bearing the electrochromic stack are manufactured. These various operations may thus cause degradation/defects such as scratches and any other type of contamination. Some of these operations may also cause short-circuits within the electrochromic stack, causing a local absence of tint that is very visible to an observer. Contamination or damage decreases the viability and effectiveness of the electrochromic stack; in other words, contamination or damage results in a decrease in the optical and energy/thermal properties conferred by said stack on the substrates.

Specifically, generally, an electrochromic stack comprises a first transparent conductive layer, a layer of electrochromic material, a layer of an ionically conductive electrolyte, a counter-electrode layer and a second transparent conductive layer. Glass substrates coated with such an electrochromic stack are very sensitive:

- to mechanical damage, since a slight scratch may cause a short-circuit between the two transparent conductive layers, this possibly then preventing the glazing from coloring, and
- to chemical damage, such as damage due to moisture, since the electrolyte, which contains lithium ions, may react with water, this then possibly leading to a degradation of the performance of the final glazing and in particular to a degradation of the uniformity and therefore of the esthetic appearance of the glazing, as well as to a loss of contrast due to a lower absorbance of the active layers after the chemical damage.

It is known to protect an electrochromic stack deposited on a glass substrate with a protective layer comprising a peelable transparent polymer adhesive film. However, these films have the following drawbacks:

- a high cost,
- a long and tedious peeling step liable to leave residues and marks on the electrochromic stack during the removal of these films, thus causing a decrease in the quality of the final glazing,
- the need to manage the waste peeled films, and
- the generation, as the film is peeled away, of defects due to adhesion of the film to the last layer of the electrochromic stack, which may cause very visible local delamination of the electrochromic stack.

It is also known to protect substrates coated with a functional coating with an organic protective layer; the latter is then removed with a high-temperature heat treatment such as a temper, i.e. a heat treatment at a temperature above 600° C., this removing step often being followed by a washing step.

These protecting methods have the drawbacks of providing only temporary protection and of needing to be removed before the glazing or final optical system is obtained. It is therefore necessary to make provision for steps of removing the protective layer, this making the manufacture of the optical system or glazing longer and more complex. Furthermore, after the protective layer has been removed or peeled off, the electrochromic stack is no longer protected in subsequent manufacturing steps.

There is therefore a need to protect, in a simple manner, the surface of an electrochromic stack deposited on a glass substrate, throughout all the manufacturing operations to which it is subjected, whether they be steps of converting; treating mechanically, chemically or with heat; handling; transporting; washing; storing and/or cutting or cleaving.

To this end, one subject of the invention is an optical system comprising:

- an optical element comprising a glazing-function substrate and an electrochromic stack formed on this substrate, this electrochromic stack including a first transparent conductive layer,
- a working electrode arranged above said first transparent conductive layer,

- a counter-electrode arranged above said working electrode,
- a second transparent conductive layer arranged above said counter-electrode,
- lithium ions introduced into said electrochromic stack,
- and preferably a separate layer of an ionic conductor, the latter layer being intermediate between the electrode and the counter-electrode,
- a protective layer arranged on said electrochromic stack, said protective layer comprising an inorganic lubricating compound.

Thus, the electrochromic stack of the optical system according to the invention is protected, in a simple and effective manner, against friction and therefore against scratches that could be caused thereby. Furthermore, the protective layer also limits the risk of degradation of the electrochromic stack as a result of chemical corrosion.

The protective layer may in particular be deposited on said electrochromic stack.

The following are other advantageous and nonlimiting features of the optical system according to the invention:

- the protective layer has a thickness comprised between 1 and 30 nanometers, preferably between 2 and 15 nanometers, preferably between 2 and 10 nanometers, and preferably between 2 and 5 nanometers;
- the inorganic lubricating compound comprises at least one of the following compounds: titanium oxide TiOx, tin-zinc oxide SnZnOx, titanium-strontium oxide TiSrOx, titanium-zirconium oxynitride TiZrOxNy, zirconium oxide ZrOx;
- the difference in light transmittance between the optical element and the assembly comprising the optical element and said protective layer is smaller than or equal to 5, of the transmittance of the optical element, preferably smaller than or equal to 4% of the transmittance of the optical element, preferably smaller than or equal to 3% of the transmittance of the optical element, preferably smaller than or equal to 2% of the transmittance of the optical element, and preferably smaller than or equal to 1% of the transmittance of the optical element;
- the protective layer is arranged on said electrochromic stack so as to withstand all the subsequent processing steps carried out on the optical system;
- the assembly comprising the optical element and the protective layer has a coefficient of friction that is low with respect to the coefficient of friction of the optical element without its protective layer, each coefficient of friction being determined via a standardized tribometer measurement;
- the assembly comprising the optical element and the protective layer has a coefficient of friction that decreases more rapidly than the coefficient of friction of the optical element without its protective layer following organic contamination, each coefficient of friction being determined via a standardized tribometer measurement;
- the assembly comprising the optical element and the protective layer has a coefficient of friction that reaches a value lower than 0.5, preferably lower than 0.4, and preferably lower than 0.3, in a time comprised between 1 and 100 hours;
- said substrate is tempered;
- provision is made for an additional protective layer comprising an organic compound that covers said protective layer;
- said organic compound comprises carbon;
- the additional protective layer has a thickness comprised between 1 and 10 nanometers, and preferably between 2 and 5 nanometers;
- the additional protective layer is removable with a heat treatment at a temperature comprised between 300 and 500° C.;
- said working electrode is made from an electrochromic material preferably based on tungsten oxide WOx or lithium-tungsten oxide LiWOx and said counter-electrode is preferably made of an oxide of a tungsten-nickel alloy, the layer of ionic conductor preferably comprises a layer of silicon oxide SiOx, and said first and second transparent conductive layers are preferably made based on indium-tin oxide (ITO);
- it furthermore comprises, between said substrate and the first transparent conductive layer, an under-layer preferably comprising an alternation of at least one layer based on niobium oxide and of at least one layer based on silicon oxide; it may be a question of an alternation of layers based on niobium oxide and of layers based on silicon oxide;
- it furthermore comprises an over-layer arranged on the second transparent conductive layer preferably comprising a layer based on silicon oxide.

The invention also relates to an insulating glazing comprising, assembled together, an optical system such as described above, a spacer and another glazing-function substrate.

The invention also relates to a process for manufacturing an insulating glazing comprising an optical system such as described above, said process comprising the following steps:

- forming the electrochromic stack on said glazing-function substrate,
- arranging the protective layer on said electrochromic stack,
- handling and/or converting and/or processing and/or transporting and/or washing and/or storing the optical system,
- preferably, assembling, via lamination of that face of the glazing-function substrate which is opposite the face located on the side of the electrochromic stack, with a counter-substrate,
- assembling said optionally laminated optical system with a spacer and a second glazing-function substrate to form the insulating glazing.

Advantageously, this process comprises at least one of the following steps: a step of cleaving or cutting the glazing-function substrate, or a step of tempering the glazing-function substrate after the step of forming the electrochromic stack.

The invention lastly relates to a process for protecting an optical element comprising a glazing-function substrate and an electrochromic stack formed on this substrate, this electrochromic stack including a first transparent conductive layer, a working electrode arranged above said first transparent conductive layer, a counter-electrode arranged above said working electrode, a second transparent conductive layer arranged above said counter-electrode, lithium ions introduced into said electrochromic stack, and, preferably, a separate layer of an ionic conductor, the latter layer being intermediate between the electrode and the counter-electrode, comprising a step of arranging a protective layer on said electrochromic stack, said protective layer comprising an inorganic lubricating compound.

By virtue of the process according to the invention, it is possible to protect an optical element comprising an electrochromic stack in a simple and effective manner, in particular throughout all the subsequent handling steps required during the manufacture and installation of a glazing comprising such an optical element.

Advantageously, provision is made for an additional step of arranging an additional protective layer that covers said protective layer, the additional protective layer comprising an organic compound, and for a subsequent step of removing the additional protective layer with a heat treatment at a temperature comprised between 300 and 500° C. This additional protective layer provides temporary additional protection that is limited to certain steps of use of the optical element.

The following description, which is given with reference to the appended figures, which are given by way of non-limiting example, will allow a clear understanding of what the invention consists of and how it may be implemented.

In the appended figures:

FIG. 1 is a partial cross-sectional view of an optical system according to the invention, FIG. 2 is a flowchart illustrating an example of a method for manufacturing an insulating glazing employing the optical system of FIG. 1, FIG. 3 is a graph showing the tangential force Ft measured in newtons via a tribometer measurement during a tribometer test comprising an out-and-back trip over the surface of the optical system according to the invention.

A plurality of particular embodiments of the invention are described below. It will be understood that the present invention is in no way limited to these particular embodiments and that other embodiments may perfectly well be employed.

As illustrated in FIG. 1, the invention relates to an optical system 10 comprising at least:

- an optical element 20 comprising a glazing-function substrate 1 and an electrochromic stack 2 formed on the substrate 1, and
- a protective layer 3 arranged on said electrochromic stack 2, said protective layer 3 comprising an inorganic lubricating compound.

The protective layer 3 may in particular be deposited on said electrochromic stack 2.

The electrochromic stack 2 here comprises:

- a first transparent conductive layer,
- a working electrode arranged above said first transparent conductive layer,
- a counter-electrode arranged above said working electrode,
- a second transparent conductive layer arranged above said counter-electrode,
- lithium ions introduced into said electrochromic stack 2, and
- preferably, a separate layer of an ionic conductor, the latter layer being intermediate between the electrode and the counter-electrode.

Alternatively, the order of the layers between the two transparent conductive layers may be inverted: counter-electrode then electrolyte and lastly electrochromic material.

The arrangement of a layer "above" or "below" another does not necessarily mean here that these two layers make direct contact with one another. The terms "above" and "below" here refer to the order of arrangement of these various elements. The order of arrangement of the layers is chosen arbitrarily with respect to the glazing-function substrate. Alternatively, such an order of arrangement may be inverted, with respect to said substrate. In addition, two layers deposited one above the other may for example be physically separated by one or more intermediate layers.

In the same spirit, the term "between" does not necessarily mean that three designated elements make direct contact with one another.

Similarly, the expression "formed on" is used to express the fact that a layer is placed on a given side of another layer. This expression does not imply that the layer in question is formed "directly" on the other layer. Other intermediate layers may be arranged between said layer and the other layer.

From a structural point of view, and as known, the electrochromic stack 2 comprises the two electrodes intermediate between the two transparent electrically conductive layers. At least one of these electrodes is made of an electrochromic material that, by definition, is suitable for reversible and simultaneous intercalation of ions and electrons, the oxidation states corresponding to the intercalated and de-intercalated states being of different tints, one of the states having a higher light transmittance than the other. The intercalation or de-intercalation reaction is controlled by means of the two transparent conductive layers, the electrical power supply of which is provided by a current generator or a voltage generator.

Thus, the two electrodes comprise a working electrode and a counter-electrode.

The working electrode is here preferably made of a cathodic electrochromic material suitable for capturing ions when a voltage is applied across the terminals of the electrochromic system. The tinted state of the working electrode corresponds to its most reduced state. The cathodic electrochromic material is preferably based on tungsten oxide WOx or lithium-tungsten oxide LiWOx. As a variant, the electrochromic material of the working electrode may be an anodic electrochromic material based on iridium oxide.

Intercalation of cations, in particular protons or lithium ions, into these electrochromic materials is possible.

Symmetrically with respect to the working electrode, reversible intercalation of cations into the counter-electrode is also possible. In other words, this counter-electrode is thus able to cede ions when a voltage is applied across the terminals of the electrochromic system. This counter-electrode is a layer of neutral tint, or at the very least a layer that is transparent or not highly colored when the working electrode is in the clear state, and preferably has a tint in the oxidized state such as to increase the total contrast of the electrochromic stack, between its tinted state and its clear state. The counter-electrode is preferably based on an oxide of an element chosen from tungsten, nickel, iridium, chromium, iron, cobalt and rhodium, or based on a mixed oxide of at least two of these elements, a mixed nickel-tungsten oxide in particular.

The working electrode and the counter-electrode are separated by an interface region commonly called the "electrolyte" (but also known as the ion-conductor (IC) which has a dual, ion-conductor and electrical-insulator function. The ion-conductor layer therefore prevents any short-circuit between the working electrode and the counter-electrode. It in addition allows the two electrodes to hold a charge and thus keep their clear and tinted states.

According to one particular embodiment, the ion-conductor layer is formed by deposition between the working electrode and the counter-electrode of a separate intermediate layer. The limits between these three layers are defined by abrupt changes in composition and/or microstructure. Such electrochromic stacks therefore have at least three separate layers separated by two separate abrupt interfaces.

In particular, the electrolyte may take the form of a polymer or of a gel, in particular a protonically conductive polymer, for example such as those described in European patents EP 0 253 713 and EP 0 670 346, or a polymer able to conduct lithium ions, for example such as those described in patents EP 0 382 623, EP 0 518 754 or EP 0 532 408. A hybrid electrochromic stack is then spoken of.

This electrolyte may also be a mineral layer forming an ion conductor that is insulating electronically, for example such as those described in European patents EP 0 867 752 and EP 0 831 360. An "all solid-state" electrochromic stack is then spoken of.

The electrochromic stack may also be an "all-polymer" stack, in which two conductive layers are placed on either side of a stack comprising a cathodic tinting polymer, a polymer that is electronically insulating but that conducts ions (most particularly H+ or Li+) and lastly an anodic tinting polymer (such as polyaniline or polypyrrole).

The ion-conductor layer may take the form of a gel solution and/or of an ionically conductive polymer and/or of one or more mineral layers that are deposited by magnetron cathode sputtering, by chemical vapor deposition (CVD) or using a sol-gel process.

The ion-conductor layer here preferably comprises a layer of silicon oxide SiOx.

Alternatively, the working electrode and the counter-electrode are deposited one above the other and generally in contact with each other, and a transition region having an electrolyte function is formed only subsequently, via migration of components within the electrodes during the manufacturing process and in particular during phases of heating the electrochromic stack 2.

The electrochromic stack may also comprise various layers, in particular under-layers that are preferably based on oxides, over-layers that are preferably based on oxides or intermediate layers, which layers are for example intended to facilitate deposition of a subsequent layer, or to protect certain layers from mechanical or chemical aggression (resistance to corrosion, to abrasion, etc.). Certain of these under-layers and over-layers are described in more detail below.

Of course, the two conductive layers must be connected to respective connectors for relaying current. This connection is conventionally obtained by means of metal foils that are placed in contact with the first conductive layer and the second conductive layer, respectively. The current relays, in particular ones based on silver, may also be obtained using a screen-printing technique, and may also be deposited, in particular in the form of busbars, on the second transparent conductive layer. By "conductive layer" what is meant here is a layer that conducts electricity, in other words, an electrically conductive layer.

According to one preferred embodiment, the electrochromic stack is preferably "all solid-state" and comprises, in succession starting from the substrate:

- the first conductive layer, which is preferably based on ITO, of a thickness of 420 nm; as a variant, it may be a question of a fluorine- or antimony-doped tin-oxide layer, or of a multilayer comprising a stack of layers such as ITO/ZnO:Al/Ag/ZnO:Al/ITO, in particular of respective thicknesses 15 to 20 nm for the ITO/60 to 80 nm for the ZnO:Al/3 to 15 nm for the silver/60 to 80 nm for the ZnO:Al/15 to 20 nm for the ITO,
- the working electrode in the form of a layer of cathodic electrochromic material, preferably based on tungsten oxide WO3 or mixed vanadium-tungsten oxide, for example of a thickness of 400 nm,
- the layer of an ionically conductive electrolyte, which is preferably a layer of silicon dioxide, typically of 5 nm thickness,
- the counter-electrode (here the anode), which is preferably made of an oxide of a tungsten-nickel alloy, for example of a thickness of 270 nm,
- the second transparent conductive layer, which is preferably based on ITO, for example of a thickness of 420 nm, or on SnO2:F, or as a variant an upper conductive layer comprising other conductive elements: it may more particularly be a question of associating the conductive layer with a layer that is more conductive than it, and/or with a plurality of conductive strips or wires. The reader is referred to patent application WO-00/57243 for more details on the implementation of such multi-component conductive layers.

Each layer is preferably deposited by magnetron cathode sputtering. As a variant, each layer could be obtained by thermal evaporation or electron-beam evaporation; by laser ablation; by chemical vapor deposition (CVD), optionally plasma-enhanced or microwave-plasma chemical vapor deposition; or using an atmospheric-pressure technique, in particular layer deposition by sol-gel synthesis, in particular employing dip coating, spray coating or laminar flow coating.

In addition, the optical system 10 according to the invention is suitable for undergoing a temper after deposition of the electrochromic stack 2. The optical system 10 then preferably comprises an electrochromic stack 2 able to withstand the tempering steps, i.e. to withstand a heat treatment with heating to a temperature of at least 650 degrees Celsius (° C.).

Preferably, here, the electrochromic stack 2 makes direct contact with said substrate 1.

As a variant, one or more intermediate layers may be arranged between the substrate 1 and the electrochromic stack 2.

The glazing-function substrate 1 may in particular be any material suitable for glazing manufacture. It may in particular be a question of a vitrified material, of glass or of a suitable plastic.

The glass substrate of the optical system according to the invention is in particular a soda-lime-silica substrate and has a thickness comprised between 1.5 millimeters (mm) and 6 mm, and preferably a thickness equal to 2.1 mm. The glass substrate is preferably made of float glass, i.e. liable to have been obtained using a process consisting in pouring molten glass onto a bath of molten tin (float bath).

The substrate 1 may or may not be tempered. It may have any thickness. It may have any optical characteristic; in particular it may or may not be tinted.

Preferably, here, the protective layer 3 makes direct contact with the electrochromic stack 2. As a variant, one or more intermediate layers may be arranged between the electrochromic stack 2 and the protective layer 3.

The protective layer 3 may form the external face of the optical system 10. As a variant, one or more additional layers may be arranged above the protective layer 3 and form the external face of the optical system, as is for example the case in the embodiment of the invention shown in FIG. 1. The optical system 10 of FIG. 1 here comprises an additional layer 4 that will be described in more detail below.

The protective layer 3 comprises at least one inorganic lubricating compound.

According to one embodiment of the optical system according to the invention, it comprises a single protective layer comprising said inorganic lubricating compound. This protective layer is preferably arranged in direct contact with the electrochromic stack and forms the external face of the optical system.

According to another embodiment of the optical system according to the invention, it comprises a plurality of protective layers each comprising one inorganic lubricating compound. This plurality of protective layers is preferably arranged in direct contact with the electrochromic stack and forms the external face of the optical system.

According to another embodiment of the optical system according to the invention, it comprises a plurality of protective layers, at least one of which comprises said inorganic lubricating compound. In particular, the optical system 10 according to the invention may comprise the protective layer 3 containing the inorganic lubricating compound and the additional layer 4 comprising another compound, for example an organic compound, as is for example schematically shown in FIG. 1.

Preferably, the additional layer 4 is arranged above the protective layer 3. This additional layer 4 here forms the external face 11 of the optical system 10. The protective layer is preferably arranged in direct contact with the electrochromic stack 2, between the latter and the additional layer 4.

When the protective layer 3 makes direct contact with the electrochromic stack, this means that it makes contact with one of the two transparent conductive layers or with the over-layer arranged above the transparent conductive layer that is furthest from the substrate 1.

Whatever the embodiment in question, said inorganic lubricating compound of the protective layer 3 preferably comprises at least one of the following compounds: titanium oxide TiOx, tin-zinc oxide SnZnOx, titanium-strontium oxide TiSrOx, titanium-zirconium oxynitride TiZrOxNy, zirconium oxide ZrOx, hafnium oxide HfOx, cerium oxide CeOx.

The protective layer 3 has a thickness comprised between 1 and 30 nanometers, preferably between 2 and 15 nanometers, and preferably between 2 and 10 nanometers.

Advantageously, the characteristics of the protective layer 3, i.e. characteristics such as its chemical composition and its thickness, are determined such that the difference in light transmittance between the optical element and the assembly comprising the optical element and said protective layer is smaller than or equal to 5 of the transmittance of the optical element, preferably smaller than or equal to 4%, preferably smaller than or equal to 3%, preferably smaller than or equal to 2%, and preferably smaller than or equal to 1, of the transmittance of the optical element.

The light transmittance of the optical element 20 is defined as the ratio of the light intensity of a light beam having passed through this optical element 20 to the light intensity of the light beam incident on the corresponding optical element 20.

In other words, the protective layer 3 is preferably transparent.

It is also very thin with respect to the thickness of the optical element 20. The electrochromic stack 2 alone already has a thickness typically comprised between 1 and 2 microns, i.e. a thickness about 100 times larger than that of the protective layer 3.

Thus, the variation in light transmittance caused by arranging the protective layer 3 on the optical element 20 is limited. The protective layer 3, which is required to remain on the electrochromic stack 2 not only during the process of manufacturing the glazing, but also during use of the glazing when the latter is installed in a building, has a limited effect on the light transmittance of the assembly comprising the optical element 20 and the protective layer 3. In particular, the decrease in light transmittance due to the presence of the protective layer is limited. The obtained optical system 10 has optical characteristics that are suitable for use thereof in an architectural glazing.

The protective layer 3 protects the optical assembly 20, and in particular the electrochromic stack 2, from friction-related scratches that could damage the electrochromic stack after its arrangement on the substrate 1 and during all the subsequent steps of handling the assembly comprising the optical element 20 and the protective layer 3, i.e. all the steps carried out after the arrangement of the protective layer on the electrochromic stack.

The protective layer 3 protects the electrochromic stack 2 by virtue of its lubricating effect.

This lubricating effect is quantified by the decrease in the coefficient of friction μ of the external face 11 of the optical system 10, compared to the coefficient of friction μi of the external face of the electrochromic stack 2 without its protective layer.

More precisely, the assembly comprising the optical element 20 and the protective layer 3 has a coefficient of friction μ that is low with respect to the coefficient of friction μi of the optical element 20 without its protective layer, these coefficients of friction being determined via standardized tribometer measurements.

Conventionally, the tribometer allows the tangential force Ft of a rubber as a function of its movement over a given surface to be measured for a known applied normal force Fn. The ratio between the tangential force and the normal force then gives the coefficient of friction m.

To this end, a tribometer comprises a measurement arm and a sample holder.

The measurement arm is connected to a structure. It comprises, at its end, a pin equipped, at its free end, with a rubber. A mass is attached to the end of the arm, plumb with the pin.

The holder lies in a plane orthogonal to the axis of the pin, thereunder, and is movable in at least one direction of this plane, and preferably in two orthogonal directions of this plane.

For example, the holder comprises a motorized stage suitable for being moved in two orthogonal directions, both forward and backward in each direction. The sample, here an optical system 10 according to the invention, is placed on the sample holder. The substrate is placed against the holder and the external face 11 of the optical system 10, the coefficient of friction of which must be determined, is placed facing away from the holder, in contact with the pin.

The mass then applies, to the sample placed under the pin, in contact therewith, a normal force equal to its weight. The sample is moved. The tangential force exerted by the pin on the surface is measured.

To take a measurement, a plurality of tests are preferably carried out. During each test, the rubber of the pin is pressed against the sample to be tested via application of the normal force and the holder is moved in one of the two orthogonal directions, along a course of preset length. Each test is performed with a different course.

Generally, the coefficient of friction is for example determined using a commercial tribometer, for example the tribometer Plint TE79. The measurement parameters are for example the following:

i) no additional lubricant (other than the one or more protective layers and the one or more additional layers),
ii) relative humidity about 50 s at 20° C., iii) the measurement pin comprises a ball-shaped tip of 10-millimeter radius, iv) the normal force is 3 newtons, and v) the speed of movement of the sample is 1 millimeter per second.

Furthermore, according to one particular example of measurement, the course length is 10 mm and two courses are separated by a least 3 mm, and preferably between 3 and 5 mm, in the direction orthogonal to the courses.

Preferably, a single out-and-back trip along each course is performed.

A different rubber is used for each sample, to improve reproducibility.

For each sample, at least three tests, along three different courses, are carried out. The measurement results of these tests are then averaged.

The rubber is cleaned using a clean wipe imbibed with ethanol between each sample.

Metal, stainless steel for example, or plastic, polyacetal for example, rubbers may be used.

The measured tangential force has an identical norm during the outward and return trip of the test, but it is oriented in opposite directions during the two phases of this movement. Therefore, the measured tangential force is equal to Ft on the outward trip and −Ft on the return trip of the test.

Therefore, during the measurement of said tangential force Ft as a function of time, two plateaus P1, P2, which are shown in FIG. 3, are observed. The (outward) first plateau P1 contains all the points recorded during the first pass of the rubber, and the second P2 those that are recorded during the return of the rubber over the same course.

If the offset of the tribometer is well adjusted, identical values h1 and h2 (FIG. 3) are obtained for the norm of the tangential force on the outward and return trips. The (return) second pass of the rubber in the reverse direction is then no longer necessary.

However, in practice, it is difficult to perfectly adjust the offset. It is therefore to overcome its influence that an out-and-back trip is required.

Generally, all the points positioned on the top plateau P1 and on the bottom plateau P2 are taken into account to calculate an average and determine the tangential force. In practice, this tangential force is computed to be the average of the absolute values of the average value of the tangential force measured for each plateau, i.e. Ft=(|average(plateau P1)|+|average(plateau P2)|)/2 for each out-and-back trip.

The coefficient of friction is computed using the formula: $\mu$=Ft/Fn; with here Ft=(|average(plateau P1)|+|average(plateau P2)|)/2 and Fn=3 N.

If the experimental data gathered do not reveal the presence of two plateaus P1 and P2, these experimental data are discarded. Preferably, the standard deviation of the points located on each plateau P1, P2 must be lower than 0.1 in order to ensure the measurement has a good precision. It is generally 0.05 for a tangential force equal to 0.5 N. Therefore, if the standard deviation of the experimental data corresponding to the points of each plateau P1, P2 is higher than 0.1, these experimental data are not taken into account.

This measurement mode composed of a single out-and-back trip allows the tested surface to be damaged as little as possible and, most often, depending on the type of rubber, reproducible measurements to be obtained.

Furthermore, this situation reflects the conditions under which scratches are formed on the surface of an unprotected electrochromic stack 2, since scratches are most often the result of a single rub in a single direction.

FIG. 3 for example shows the distribution of the experimental data gathered for a measurement of the coefficient of friction of the electrochromic stack protected by the protective layer. The coefficient of friction determined from the experimental data shown in this figure is equal to about 0.5.

Generally, it is known that the decreases in the coefficient of friction of a surface is correlated to an increase in the scratch resistance of this surface. Scratch resistance is for example measured using an apparatus for testing scratch resistance, such as those sold by Erichsen.

Moreover, according to another advantageous feature of the optical system according to the invention, the assembly comprising the optical element 20 and the protective layer 3 has a coefficient of friction $\mu$ that decreases more rapidly than the coefficient of friction pi of the optical element 20 without its protective layer following organic contamination, this coefficient of friction being determined via a standardized tribometer measurement such as described above.

Preferably, the assembly comprising the optical element 20 and the protective layer 3 has a coefficient of friction that reaches a value lower than 0.5, preferably lower than 0.4, and preferably lower than 0.3, in a time comprised between 1 and 100 hours.

The gradual decrease in the coefficient of friction of the external face 11 of the optical system 10 according to the invention, i.e. after the arrangement of the protective layer on the electrochromic stack 2, is due to the capacity of this protective layer 3 to adsorb organic compounds such as hydrocarbon compounds on its surface. These organic compounds contribute to decreasing coefficient of friction and to increasing scratch resistance because the organic compounds adsorbed on the surface of the protective layer play the role of an additional sacrificial layer during any friction.

The optical system 10 according to the invention may furthermore comprise an additional protective layer 4 comprising an organic compound that covers said protective layer 3. This is for example the case in the optical system 10 of FIG. 1.

This organic compound for example comprises carbon, in particular amorphous carbon or carbon in diamond form.

This additional protective layer 4 for example has a thickness comprised between 1 and 10 nanometers, preferably between 2 and 5 nanometers, preferably between 2 and 4 nanometers, and preferably between 2 and 3 nanometers.

While the protective layer 3 is arranged above said electrochromic stack 2 so as to withstand all the subsequent steps of processing or using the optical system 10, the additional protective layer 4 is preferably removable with a heat treatment at a temperature comprised between 300 and 500° C.

Thus, the additional protective layer 4 protects the electrochromic stack 2 and the protective layer 3 in all the processing steps and each time the optical system 10 is handled before this optical system 10 is tempered. During the temper, the optical system 10 is heated to temperatures typically above 500° C., and for example of about 650° C., then rapidly cooled. This allows the mechanical properties of the substrate, especially when the latter is made of glass, to be improved.

This tempering step removes the additional protective layer 4. The protective layer 3 is in contrast preserved. This protective layer 3 remains on the surface of the electrochromic stack 2 after the temper and continues to protect the latter during processing steps and handling of the optical system 10 that occur after the temper.

Since the additional protective layer 4 is removed by the temper of the optical system 10, it may have any optical characteristic, and in particular be opaque, i.e. have a very low coefficient of transmission, for example one lower than 50%.

Furthermore, this additional protective layer 4 is removed with an already existing step of processing the optical system. It is therefore not necessary to modify the processing of the optical system.

The optical system 10 may furthermore comprise, between said substrate 1 and the first transparent conductive layer of the electrochromic stack 2, an under-layer preferably comprising an alternation of layers of material of high index, for example a layer based on niobium oxide or titanium oxide, and of layers of a material of low index, for example a layer based on silicon oxide. Said under-layer preferably has a thickness smaller than or equal to 100 nanometers, preferably smaller than or equal to 90 nanometers, preferably smaller than or equal to 80 nanometers, preferably smaller than or equal to 70 nanometers, preferably smaller than or equal to 60 nanometers, preferably smaller than or equal to 50 nanometers, preferably smaller than or equal to 40 nanometers, preferably smaller than or equal to 30 nanometers, preferably smaller than or equal to 20 nanometers, and preferably smaller than or equal to 10 nanometers.

This under-layer for example comprises a layer of 10 nanometers of niobium oxide or titanium oxide and a layer of 20 nanometers of silicon oxide. Such an under-layer in particular allows diffusion of alkali metals from the substrate to the electrochromic stack to be prevented.

The optical system 10 may also comprise an over-layer arranged (for example deposited) on the second transparent conductive layer of the electrochromic stack 2 preferably comprising a layer of a material of low index, for example a layer of silicon oxide, or an alternation of layers of material of high index and low index, for example an alternation of layers based on silicon nitride and silicon oxide. Said over-layer preferably has a thickness smaller than or equal to 100 nanometers, preferably smaller than or equal to 90 nanometers, preferably smaller than or equal to 80 nanometers, preferably smaller than or equal to 70 nanometers, preferably smaller than or equal to 60 nanometers, preferably smaller than or equal to 50 nanometers, preferably smaller than or equal to 40 nanometers, preferably smaller than or equal to 30 nanometers, preferably smaller than or equal to 20 nanometers, and preferably smaller than or equal to 10 nanometers.

This over-layer for example comprises a layer of 70 nanometers of silicon dioxide. Such an over-layer in particular allows the color in transmission and the light transmittance of the electrochromic stack to be controlled.

By "material of high refractive index n" what is meant here is a material of index higher than 1.8. By "material of low index", what is meant here is a material of index lower than 1.8.

According to the invention, the optical system 10 described above may in particular be used in an architectural glazing, in particular as an exterior glazing of an internal partition or glazed door, as a glazing with which internal partitions or windows of means of transport such as trains, airplanes, automobiles and boats are equipped, or in the glazings of display screens such as computer screens or television screens, or as objectives of cameras or to protect solar panels.

The invention thus also relates to an insulating glazing comprising, assembled together, an optical system 10 such as described above, a spacer and another glazing-function substrate.

In particular, the optical system according to the invention may be incorporated into various glazing configurations in which the various optical elements may be organized differently to form:

- a single glazing comprising the electrochromic stack 2, the substrate 1 in the form of a glass sheet, and the protective layer 3, said glazing preferably being arranged so as to place the electrochromic stack 2 in the interior of the building;
- a double glazing comprising, preferably from the exterior to the interior of the building, the substrate 1 in the form of a glass sheet, the electrochromic stack 2, the protective layer 3, a cavity filled with inert gas, a low-E coating, and another substrate in the form of another glass sheet;
- a triple glazing comprising, preferably from the exterior to the interior of the building, the substrate 1 in the form of a glass sheet, the electrochromic stack 2, the protective layer 3, a cavity filled with inert gas, a glass sheet, a cavity filled with inert gas, a low-E coating, and another substrate in the form of another glass sheet.

The inert gas may in particular be argon.

The invention furthermore relates to a process for manufacturing an insulating glazing comprising an optical system 10 such as described above, said process comprising the following steps, which are schematically shown in FIG. 2:

- forming S1 the electrochromic stack 2 on said glazing-function substrate 1,
- arranging S2 the protective layer 3 on said electrochromic stack 2,
- handling and/or converting and/or processing and/or transporting and/or washing and/or storing the optical system 10 (block S6 of FIG. 2),
- preferably, assembling S7, via lamination of that face of the glazing-function substrate 1 which is opposite the face located on the side of the electrochromic stack 2, with a counter-substrate,
- assembling S8 said optionally laminated optical system 10 with a spacer and a second glazing-function substrate 1 to form the insulating glazing.

Advantageously, the process according to the invention also comprises a step S3 of arranging the additional protective 4 on the protective layer 3.

Advantageously, this process comprises at least one of the following steps: a step S4 of cleaving or cutting the glazing-function substrate 1, and/or a step S5 of tempering the glazing-function substrate 1 after the step of forming the electrochromic stack 2.

The invention lastly relates to a process for protecting the optical element 20 comprising the glazing-function substrate 1 and the electrochromic stack 2 formed on this substrate 1, comprising a step of arranging the protective layer 3 on said electrochromic stack 2.

It may in particular be a question of a step of depositing the protective layer 3, in particular a step of depositing by magnetron deposition.

It may also be a question of deposition using a wet process.

By virtue of the process according to the invention, it is possible to protect the optical element 20 comprising the electrochromic stack 2 in a simple and effective manner, in particular in all the handling steps required during the manufacture and installation of a glazing comprising such an optical element 10 that occur after the arrangement of the protective layer.

Advantageously, provision is made for an additional step of arranging the additional protective layer 4, which covers said protective layer 3, and for a subsequent step of removing the additional protective layer with a heat treatment at a temperature comprised between 300 and 500° C.

It is in particular a question of a step of depositing the additional protective layer 4, for example by magnetron.

By "removing the additional protective layer with a heat treatment" what is meant here is that, with respect to the protective layer 3, the following is observed:

no residue of the additional protective layer 4 following said heat treatment, or a few residues of the additional protective layer 4 following said heat treatment, but these residues are easily removed by wiping using a cloth or by washing.

This additional protective layer 4 provides temporary additional protection limited to certain steps of use of the optical element.

The electrochromic stack of the optical system according to the invention is protected in a simple and effective manner against friction and therefore against scratches that could be caused by this friction. Furthermore, the protective layer also limits the risk of degradation of the electrochromic stack by chemical corrosion.

The invention claimed is:

1. An optical system comprising:

an optical element comprising a glazing-function substrate and an electrochromic stack formed on the optical substrate, the electrochromic stack including a first transparent conductive layer, a working electrode arranged above said first transparent conductive layer, a counter-electrode arranged above said working electrode, a second transparent conductive layer arranged above said counter-electrode, lithium ions introduced into said electrochromic stack, the electrochromic stack including an ionically conductive region located between the working electrode and the counter-electrode, and a protective layer arranged on said electrochromic stack, said protective layer comprising an inorganic lubricating compound, and having a thickness comprised between 1 and 30 nanometers, wherein a difference in light transmittance between the optical element and an assembly comprising the optical element and said protective layer is smaller than or equal to 5% of a transmittance of the optical element.

2. The optical system as claimed in claim 1, wherein the inorganic lubricating compound comprises at least one of the following compounds: titanium oxide TiOx, tin-zinc oxide SnZnOx, titanium-strontium oxide TiSrOx, titanium-zirconium oxynitride TiZrOxNy, zirconium oxide ZrOx.

3. The optical system as claimed in claim 1, wherein the protective layer is arranged on said electrochromic stack so as to withstand at least one of a converting, a processing, a handling, a cleaving or cutting, a transporting, a washing and a storing step carried out on the optical system.

4. The optical system as claimed in claim 1, wherein an assembly comprising the optical element and the protective layer has a coefficient of friction that is low with respect to a coefficient of friction of the optical element without its protective layer, each coefficient of friction being determined via a standardized tribometer measurement.

5. The optical system as claimed in claim 1, wherein an assembly comprising the optical element and the protective layer has a coefficient of friction that decreases more rapidly than a coefficient of friction of the optical element without its protective layer following organic contamination, each coefficient of friction being determined via a standardized tribometer measurement.

6. The optical system as claimed in claim 1, wherein an assembly comprising the optical element and the protective layer has a coefficient of friction that reaches a value lower than 0.5 in a time comprised between 1 and 100 hours.

7. The optical system as claimed in claim 1, wherein said substrate is tempered.

8. The optical system as claimed in claim 1, further comprising an additional protective layer comprising an organic compound that covers said protective layer.

9. The optical system as claimed in claim 8, wherein said organic compound comprises carbon.

10. The optical system as claimed in claim 8, wherein the additional protective layer has a thickness comprised between 1 and 10 nanometers.

11. The optical system as claimed in claim 8, wherein the additional protective layer is removable with a heat treatment at a temperature comprised between 30° and 500° C.

12. The optical system as claimed in claim 1, wherein:

said working electrode is made from an electrochromic material based on tungsten oxide WOx or lithium-tungsten oxide LiWOx and said counter-electrode is made of an oxide of a tungsten-nickel alloy, the ionically conductive region is a layer of ionic conductor that comprises a layer of silicon oxide SiOx, said first and second transparent conductive layers are made based on indium-tin oxide (ITO).

13. The optical system as claimed in claim 12, furthermore comprising, between said substrate and the first transparent conductive layer, an under-layer comprising an alternation of at least one layer based on niobium oxide and of at least one layer based on silicon oxide.

14. The optical system as claimed in claim 12, further comprising an over-layer arranged on the second transparent conductive layer comprising a layer based on silicon oxide.

15. An insulating glazing comprising, assembled together, an optical system as claimed in claim 1, a spacer and another glazing-function substrate.

16. A process for manufacturing an insulating glazing comprising an optical system as claimed in claim 1, said process comprising:

forming the electrochromic stack on said glazing-function substrate, arranging the protective layer on said electrochromic stack, performing at least one of handling, converting, processing, transporting, washing and storing the optical system, assembling, via lamination of a face of the glazing-function substrate which is opposite a face located on a side of the electrochromic stack, with a counter-substrate, assembling said laminated optical system with a spacer and a second glazing-function substrate to form the insulating glazing.

17. The process for manufacturing an insulating glazing as claimed in claim 16, comprising:

cleaving or cutting the glazing-function substrate, tempering the glazing-function substrate after the forming of the electrochromic stack.

18. A process for protecting an optical element comprising a glazing-function substrate and an electrochromic stack formed on the substrate, the electrochromic stack including a first transparent conductive layer, a working electrode arranged above said first transparent conductive layer, a counter-electrode arranged above said working electrode, a second transparent conductive layer arranged above said counter-electrode, lithium ions introduced into said electrochromic stack, the electrochromic stack including an ionically conductive region located between the working electrode and the counter-electrode, the process comprising arranging a protective layer on said electrochromic stack, said protective layer comprising an inorganic lubricating compound, and having a thickness comprised between 1 and 30 nanometers, wherein a difference in light transmittance between the optical element and an assembly comprising the optical element and said protective layer is smaller than or equal to 5% of a transmittance of the optical element.

19. The process as claimed in claim 18, further comprising arranging an additional protective layer that covers said protective layer, the additional protective layer comprising an organic compound, and subsequently removing the additional protective layer with a heat treatment at a temperature comprised between 300 and 500° C.

* * * * *